United States Patent
Deshpande

(10) Patent No.: US 7,543,034 B2
(45) Date of Patent: Jun. 2, 2009

(54) INSTANT MESSENGER REFLECTOR

(75) Inventor: Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1163 days.

(21) Appl. No.: 10/862,999

(22) Filed: Jun. 8, 2004

(65) Prior Publication Data

US 2006/0031292 A1    Feb. 9, 2006

(51) Int. Cl.
G06F 15/16  (2006.01)

(52) U.S. Cl. .................. 709/207; 709/206; 709/224

(58) Field of Classification Search ......... 709/204–207, 709/224
See application file for complete search history.

(56) References Cited

U.S. PATENT DOCUMENTS

| | | | | |
|---|---|---|---|---|
| 7,181,441 | B2* | 2/2007 | Mandato et al. | 709/217 |
| 7,356,567 | B2* | 4/2008 | Odell et al. | 709/206 |
| 7,380,007 | B1* | 5/2008 | Bu et al. | 709/219 |
| 2002/0062350 | A1 | 5/2002 | Maehiro | 709/20 |
| 2002/0065894 | A1* | 5/2002 | Dalal et al. | 709/206 |
| 2002/0120697 | A1 | 8/2002 | Generous et al. | 709/206 |
| 2003/0028597 | A1* | 2/2003 | Salmi et al. | 709/204 |
| 2004/0068567 | A1* | 4/2004 | Moran et al. | 709/227 |
| 2004/0078445 | A1* | 4/2004 | Malik | 709/206 |
| 2004/0158609 | A1* | 8/2004 | Daniell et al. | 709/206 |
| 2005/0132009 | A1* | 6/2005 | Solie | 709/206 |
| 2006/0031292 | A1* | 2/2006 | Deshpande | 709/204 |
| 2006/0095522 | A1* | 5/2006 | Rang et al. | 709/206 |
| 2007/0162605 | A1* | 7/2007 | Chalasani et al. | 709/227 |

FOREIGN PATENT DOCUMENTS

WO    WO0232096    4/2002

* cited by examiner

Primary Examiner—Ramy Mohamed Osman
(74) Attorney, Agent, or Firm—Law Office of Gerald Maliszewski; Gerald Maliszewski

(57) ABSTRACT

A system and method are provided for establishing an Instant Messenger (IM) reflector service. The method comprises: establishing an interface between an IM network server and an IM master client identified with a first username; establishing a reflector service between the IM master client and an IM peer client; and, identifying the IM peer client with the first username. That is, IM messages associated with the first username are routed via the IM master client. Alternately stated, IM messages are communicated between the IM network and all IM clients identified with the first username. More specifically, communicating IM messages with all IM clients identified with the first username includes: the IM master client receiving IM messages from the IM network, addressed to the first username; and, the IM master client distributing the IM messages to IM peer clients identified with the first username, via the reflector service.

24 Claims, 3 Drawing Sheets

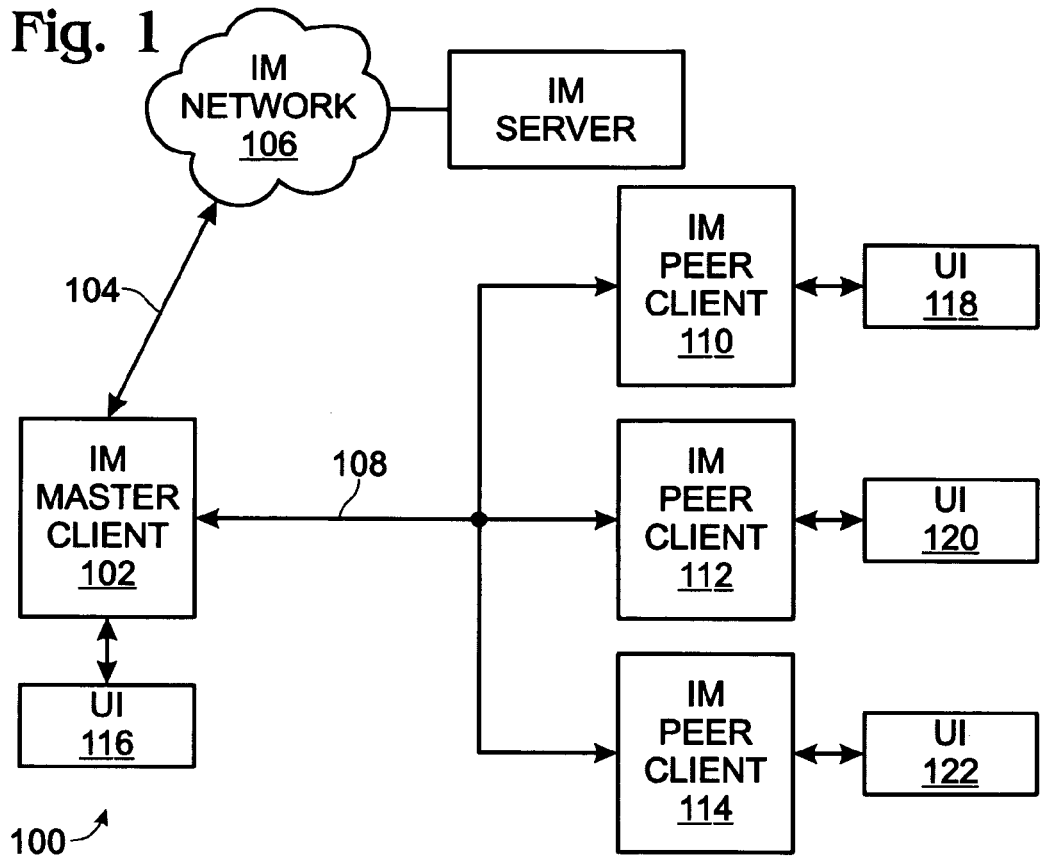
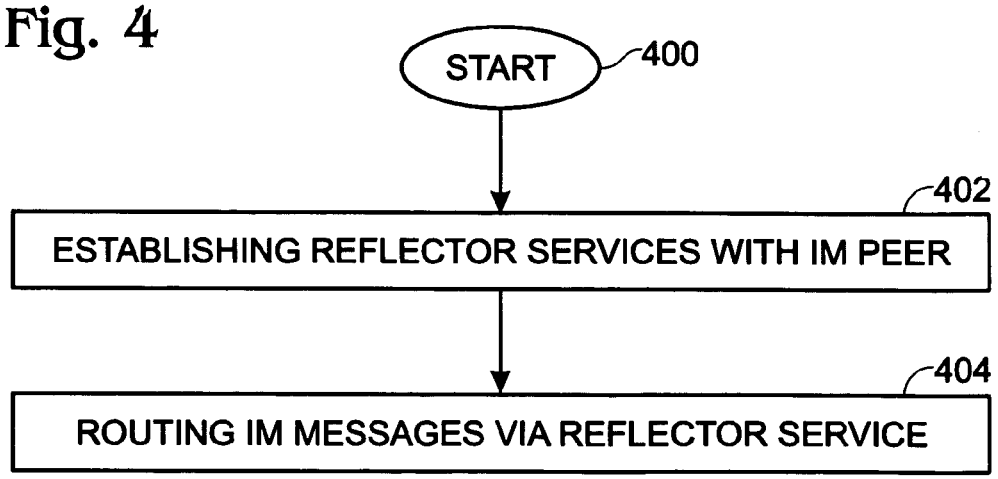

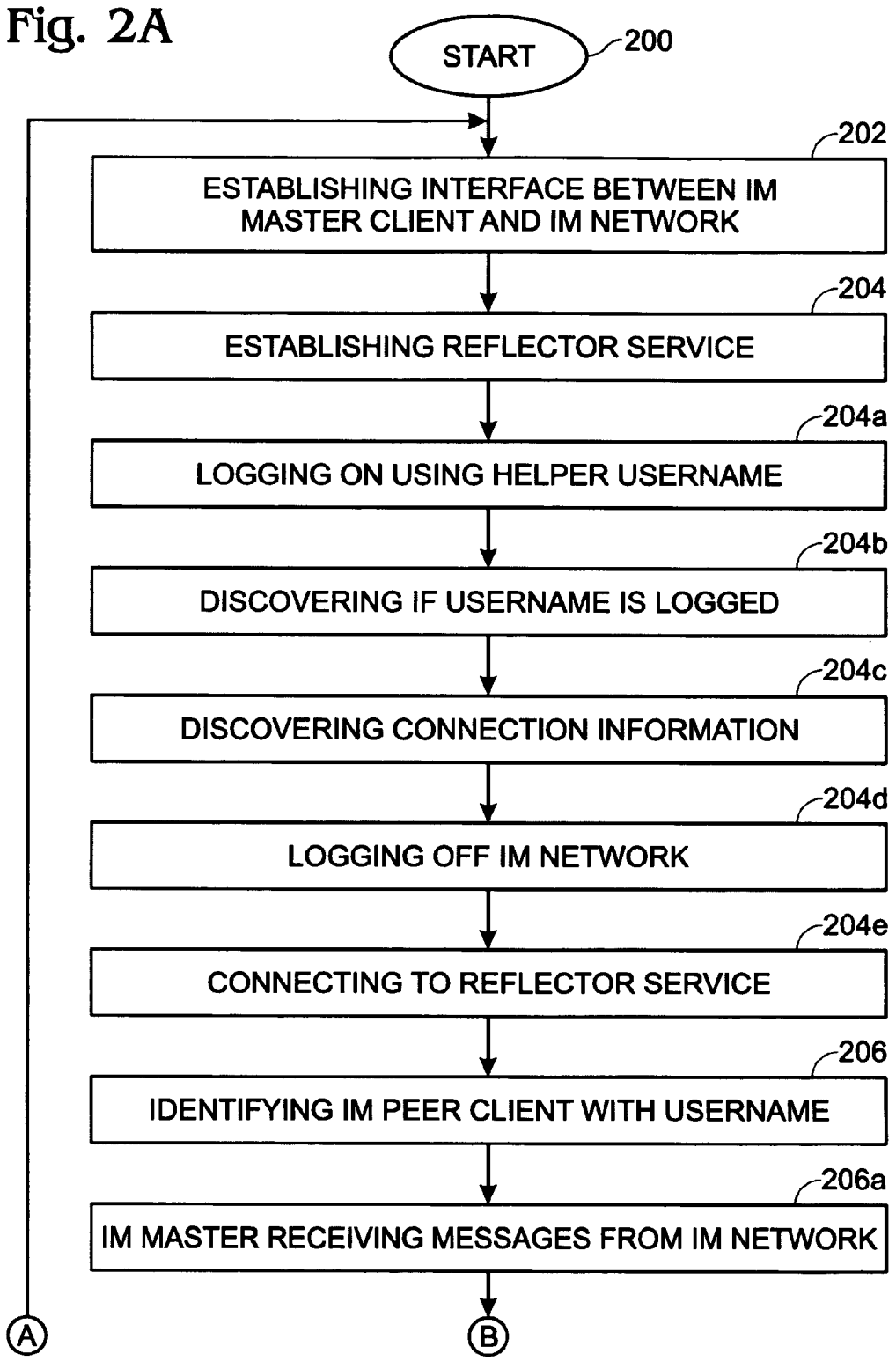

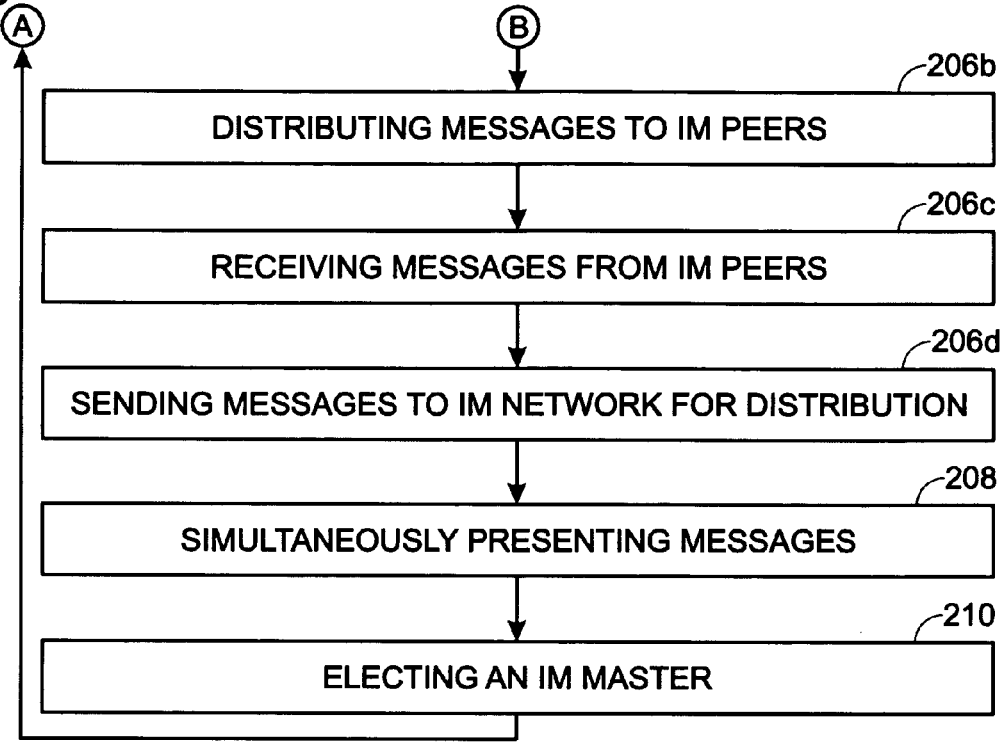
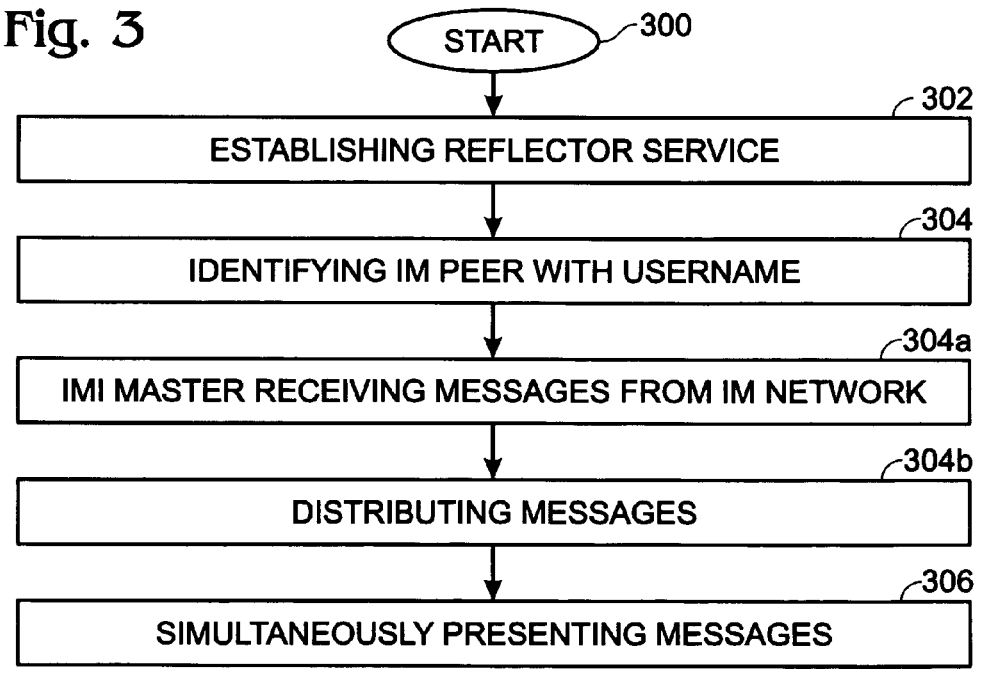

INSTANT MESSENGER REFLECTOR

BACKGROUND OF THE INVENTION

1. Field of the Invention

This invention generally relates to Internet communications and, more particularly, to an Instant Messenger (IM) reflector service that permits the same username to concurrently access IM services from multiple devices.

2. Description of the Related Art

Currently, there exist a variety of Instant Messenger (IM) softwares, including AOL Instant Messenger (AIM), MSN Messenger, ICQ, and Yahoo! Instant Messenger. At the time of this writing, all of these Instant Messengers permit a user with a certain username (or screenname) to be, at any particular time, logged into the Instant Messenger network from only one location (device). If a user logs in using a username (i.e., user1) from device1 and later moves to device2, and uses the same username(user1) to login into the Instant Messenger service, then the user's session on the device1 is ended and a disconnect message is sent to the Instant Messenger on device1. The user's login from device2 is successful and they can carry on instant messaging from the device2.

Conventionally, AIM and AOL clients (requires AOL subscription) can use the same username, to send and receive Instant Messages on different devices, simultaneously. However, these services require special server support. Other conventional universal Instant Messenger client softwares exist based upon the Jabber protocol. Jabber is an open XML protocol for the real-time exchange of messages and presence between any two points on the Internet. Universal IM clients such as TipicIM client and RhymBox client permit communication with AIM, MSN, ICQ and Yahoo! IMs from one unified user interface. However, starting a universal IM client from a second device, with the same username as the first device, disconnects the first session as a new session is established from the second device.

Conventional MSN Polygamy software permits a person to use multiple copies of MSN messenger at the same time, thus allowing a person to use multiple accounts (usernames) at the same time. MSN Polygamy works for MSN messenger version 4 and 5 (the current version as of this writing is 6). This software is designed to let users use multiple MSN accounts (usernames) from the same device. However, the software does not permit users to use the same username from multiple devices. That is, a new session cannot be initiated without logging out of the other sessions at other devices.

It would be advantageous if a user could access IM services from multiple devices with the same username, without special support from the server.

SUMMARY OF THE INVENTION

The present invention permits the use of the same username to access the Instant Messenger service concurrently from multiple devices. The present invention IM reflector works with the existing Instant Messenger services, including Yahoo!, AOL, MSN, and ICQ. Using the IM reflector approach, a user can send and receive messages via Instant Messenger from multiple devices, using the same username, at the same time. The invention has application to the Home network and Enterprise environments, where such a functionality would be beneficial. The invention does not impose any additional burden or bandwidth requirements on the Instant Messenger service network or central server. The invention does not require server support in permitting multiple Instant Messenger clients to use the same username concurrently. Rather, the approach works by creating an Instant Messenger reflector topology that includes a plurality of same username Instant Messenger clients. The invention permits IM clients to determine their own role—either as a master or a peer IM client.

Accordingly, a method is provided for establishing an Instant Messenger (IM) reflector service. The method comprises: establishing an interface between an IM network server and an IM master client identified with a first username; establishing a reflector service between the IM master client and an IM peer client; and, identifying the IM peer client with the first username. That is, IM messages associated with the first username are routed via the IM master client. Alternately stated, IM messages are communicated between the IM network and all IM clients identified with the first username.

More specifically, communicating IM messages with all IM clients identified with the first username includes: the IM master client receiving IM messages from the IM network, addressed to the first username; and, the IM master client distributing the IM messages to IM peer clients identified with the first username, via the reflector service. Further, the IM master client receives IM messages from the IM peer client, via the reflector service; and, the IM master client sends the IM messages to the IM network for distribution, identifying the first username as the source.

Establishing a reflector service between the IM master client and an IM peer client includes the IM peer client: logging onto the IM network using a first helper username; discovering if the first username is logged on; if so, discovering connection information associated with the IM master client; logging off the IM network; and, connecting to the reflector service offered by the IM master client using the discovered connection information.

Alternately, in response to discovering that the first username is not online, the IM peer client: logs off the IM network; logs onto the IM network using the first username; and, establishes an interface with the IM network as the IM master client.

Additional details of the above-described method and an IM reflector service system are provided below.

BRIEF DESCRIPTION OF THE DRAWINGS

FIG. 1 is a schematic block diagram of the present invention Instant Messenger (IM) reflector service system.

FIG. 2 is a flowchart illustrating the present invention method for establishing an IM reflector service.

FIG. 3 is a flowchart illustrating the present invention method for communicating via an IM reflector service.

FIG. 4 is a flowchart illustrating a variation in the present invention method for communicating via an IM reflector service.

DETAILED DESCRIPTION OF THE PREFERRED EMBODIMENTS

FIG. 1 is a schematic block diagram of the present invention Instant Messenger (IM) reflector service system. The system 100 comprises an IM master client 102, with an IM network first username, having an interface on line 104 to an IM network. An IM server 106 has an IM network interface on line 104 connected to the IM master client interface. The IM master client 102 has an interface on line 108 to supply an IM reflector service. An IM peer client is also identified with the first username, and has an interface on line 108 connected to the IM master client 102 to receive IM reflector services.

Shown are a plurality of IM peer clients 110, 112, and 114, each having an interface connected to the IM master client 102 on line 108 to receive IM reflector services, and each identified with the first username. The invention is not limited to any particular number of IM peer clients. It should also be noted, as explained in more detail below, that the interface represented by line 108 may physically be same interface as represented by line 104, without the higher connection to the IM server 106. That is, interfaces 104 and 108 may both use IP addresses and protocol to enable lower level communications.

The IM master client 102 routes IM messages associated with the first username between the IM peer clients 110/112/114 and the IM network on line 104. That is, the IM master client 102 communicates IM messages between the IM network on line 104 and all IM clients identified with the first username. More specifically, the IM master client 102 receives IM messages from the IM network on line 104, addressed to the first username, and distributes the IM messages to IM peer clients 110/112/114 identified with the first username, via the reflector service on line 108. The IM master client 102 receives IM messages from the IM peer client, for example IM peer client 110, via the reflector service on line 108, and sends the IM messages to the IM network 106 on line 104 for distribution, identifying the first username as the source.

Typically, each IM client is associated with a user interface (UI) that may include support for a display, keyboard, mouse, or the like. For example, the IM master client 102 has a UI 116 for presenting IM messages addressed to the first username. Likewise, the IM peer clients 110/112/114 have UIs 118/120/122, respectively, for simultaneously presenting IM messages addressed to the first username.

An IM peer client, for example IM peer client 110, establishes a reflector service connection on line 108 by logging onto the IM network 106 on line 104 using a first helper username and discovering if the first username is logged on. If the first username is being used, then an IM master client has already been established. The IM peer client 110 discovers connection information associated with the IM master client 102 and logs off the IM network 106 on line 104. Then, the IM peer client 110 connects to the reflector service offered by the IM master client 102 on line 108 using the discovered connection information.

The IM peer client 110 discovers connection information associated with the IM master client 102 by sending a reflector discovery message, via the IM network 106 on line 104, to the first username. In this case, the IM master client 102 is using the first username. The IM peer client receives a connection information message from the IM master client 102 including an IP address and port number. The IM peer client 110 connects to the IM master client reflector service on line 108 by opening a reflector connection with the IM master client 102. For example, the IM peer client 110 opens a TCP/IP connection with the master IM client 102 to receive reflector services. The IM peer client 110 uses the IM master client as an intermediary link with the IM network 106. Further, the IM peer client 110 may connect to the IM master client 102 for reflector services on line 108 using a reflector service-specific username and password.

Alternately, there may be no IM master client established, or the IM master client 102 becomes disconnected from the IM network 106. If the IM peer client 110 discovers that the first username is not online, then, the IM peer client logs off the IM network 106 on line 104 (using the helper name). Instead, the IM peer client 110 logs onto the IM network 106 using the first username and establishes an interface with the IM network 106 as the IM master client.

If the (initial) IM master client 102 disestablishes an interface with the IM network on line 104, then a plurality of IM peer clients, for example IM peer clients 110, 112, and 114, log onto the IM network 106 using the first username. A new IM master client is elected from among the IM peer clients logged on using the first username. For example, client 110 may be elected as the new master IM client. In one aspect, each IM peer client 110, 112, 114 initializes a clock period. In response to a random time delay, each IM peer client logs on using the first username. Then, the last IM peer client logging on, before the expiration of the clock period, is elected. If a new IM master client is not elected in the clock period, a new period is initiated. Details of this specific election procedure are presented below. Alternately, specific clients may be pre-selected for the master client role, or a pre-established hierarchical order of clients may be created.

To prevent eavesdropping, an access control feature may be added to the system 100. For example, the IM master client 102 is additionally identified with a first password, as well as the first username, for communications with the IM network 106 on line 104. Likewise, the IM peer clients 110/112/114 may also additionally identified with the first password, through the reflector service on line 108.

In summary, the IM reflector service system 100 may be described as an IM master client 102, with an IM network first username, having an interface to an IM network 106 on line 104, and an IM peer client interface on line 108 to supply IM reflector services. The IM master client 102 routes IM messages associated with the first username between the reflector service on line 108 and the IM network 106 on line 104. The IM master client 102 receives IM messages, from the IM network 106, addressed to the first username, and distributes the IM messages via the reflector service on line 108. Further, the IM master client 102 receives IM messages via the reflector service on line 108, and sends the IM messages to the IM network 106 for distribution, identifying the first username as the source.

In another variation, the present invention IM reflector service system 100 may be described as comprising an IM peer client 110, identified with a first username, having an interface to an IM network 106 via an IM first username reflector service on line 108. The IM peer client 110 communicates IM messages associated with the first username to the IM network 106, via the IM first username reflector service on line 108. The IM peer client 110 receives all IM messages, from the IM network 106, addressed to the first username, via the reflector service on line 108.

FUNCTIONAL DESCRIPTION

The present invention IM reflector technology permits any number (1 or more) of simultaneous Instant Messengers clients, on multiple devices, to use the same username concurrently. The IM reflector technology does not require server support. Thus, there is no extra load or additional bandwidth requirements for the central IM server to support multiple instances of IM using same username. The IM reflector technology supports configurations where each of the IM instances with the same username is supported with only a subset of the full IM service features.

Below are presented some exemplary cases in the home network and enterprise environments that highlight the benefits of using the IM reflector service.

Home Network

Case 1:

An individual has multiple networked devices at home including computers, handheld devices (PDAs/cell-phones), and television sets. Each of the devices has an IM client. The individual is using the same username (screenname) on all these devices and the Instant Messenger reflector application is active (running) on all the devices. As a result of being logged on from several devices, the individual can send and receive messages, to and from buddies, from any of these multiple devices at various locations in the home. The individual can use IM features, such as alerts, from all the multiple locations.

As an example, the individual is watching a TV program in the living room and is chatting with a buddy. In the middle of this session the user goes to the kitchen to cook dinner. A networked device in the kitchen has an IM client with the IM reflector service installed. When the individual goes to kitchen, they can see the current IM session with all the messages exchanged while watching the TV, and they are able to continue the conversation from where they left off in the living room. When the individual comes back to the living room to watch the TV, they again see the same entire IM session, and can carry the conversation still further.

Case 2:

An individual has multiple networked devices at home including computers, handheld devices (PDAs, cell-phones), and television sets. Each of the devices has the IM client and reflector service installed. The individual's young child is only allowed to IM chat in a "supervised" mode. In this scenario the child's username is accessible to her mother, based on an agreement between the mother and her child. The child uses the IM from her computer in her bedroom and chats with her buddies. The mother can see all the instant messages exchanged by her child using an instant messenger client with the reflector service. The mother may silently observe all the messages exchanged.

Enterprise Use Case:

Case 1:

A US company has multiple conference rooms, each equipped with a networked client device, such as a computer, with an IM reflector service installed on each device. The company has an overseas office in India. The IM is used to support regular weekly meetings between a US office and the office in India. Only a few members from the US office actively participate in the weekly meeting from a meeting room. But other members are interested in passively observing the Instant Messenger communication either from other conference rooms, or on their own personal computers.

In this situation, each of the IM clients in the conference rooms is allowed to log in using the same username. Thus, the Instant Messages being exchanged can be viewed from various different locations (different conference rooms). In addition, certain (high-ranking) members may be given access to the common username (and password), to observe the Instant Messages from their own office, or from home. It is possible to configure the IM clients as "read-only" or passive clients who can only see (receive) all the messages, but cannot send their own messages.

Conventionally, the above-mentioned Enterprise Use Case 1 type of scenario can be supported if each of the multiple participants joins a common IM "conference" which supports multiple participants. A drawback for this approach is that a separate username is required for each participant. However, the present invention approach permits the same username to be used from multiple locations. The present invention IM reflector service makes it easier to manage a system where the multiple conference rooms are not in the same building, or are maintained by different technical support organizations.

Architecture:

In the following description user1 and passwd1 are the common username and the password shared by the reflector service clients. When an IM client is initiated, it first discovers if another IM client is already logged onto the IM network with the username user1. The discovery process is explained in more detail below. If it is discovered that there is currently no IM client logged in with the username user1, the IM client logs itself onto the IM network with the username user1 and password passwd1.

The IM client then starts a reflector server service. The reflector service is used like a router to send and receive messages from multiple IM clients using the same username concurrently. The term "IM master client" refers to the IM client using username user1 to login onto the IM network.

Alternately, a device (for example, device2) discovers another instance of an IM client (for example, device1) already logged onto the IM network using username user1. In general, there may be multiple devices device3, device4, ... devicen, that may want to use the same name. Then, device2 locates the IP address (and if required, other information about the reflector service such as port number) of device1. Device2 then connects to the reflector service offered by the IM master client on device1. Device2 can now send or receive IM messages using the username user1. This is made possible through the present invention reflector service.

It should be noted that device2, which is using username user1 to send and receive IM messages, is not actually logged in to the IM network directly. The term "IM peer client" is used to refer to an IM client that is using username user1, without actually being logged onto the IM network.

Role Discovery:

When an IM client is started, it must first discover if it is to be an IM peer client or an IM master client, with respect to a particular username (user1 for example). The decision is based on upon whether an IM master client is currently logged onto the IM network with username user1. Conventional IM networks, including those from AOL, MSN, ICQ and Yahoo!, disconnect a currently logged-in user with a certain username if the same username is used from another location. Thus, to determine if a username user1 is currently online, and to prevent the disconnection of this user, a helper user name is created (for example, userhelper1). The helper username can be created off-line, automatically, at the same time that the username user1 is created, or manually. Only one helper user name is required, and it can be used to support multiple IM clients.

To discover their role, an IM client initially connects to the IM network using the helper user name (userhelper1). It then uses the IM network to find out if the username user1 is currently online. If user1 is not currently online, it logouts from the username userhelper1 and logins again as user1 and becomes IM master client for username user1. Race conditions can occur during this stage of the process, as described in more detail below.

Master IM Master Client:

An IM master is able to directly connect to the IM network using the first username (user1). The IM master client runs the reflector service for instant messages. At any one time, there is only one IM master client for a certain username.

IM Peer Client:

An IM peer client is connected to the reflector service via the IM master client. An IM peer client uses the same username as its IM master client. An IM peer client can send and receive Instant Messages and use other IM features as available from the reflector service. At any one time, there can be multiple IM peer clients for a certain username.

Locating the IM Master Client:

After determining its role as an IM peer client, the IM peer client connects to the reflector service of the master IM client. For this, it needs to locate the IM master client. This is similar to the service discovery scenario. The IM peer client needs to discover the IP address (and if required port number and other service specific information) for the IM master client. The master client and peer client may be on the same subnet or may be across the Internet. Conventional IM networks, including those from AOL, MSN, ICQ and Yahoo!, do not support any kind of direct communication mode, and all conventional Instant Messages must traverse through the IM network, except for certain operations such as file transfer.

The following is an exemplary connection information discovery process. The IM master client knows its local IP address, port number (dynamic or fixed) for its reflector service, and other configuration information for the service. An IM peer client logs in to the IM network using the helper user name (userhelper1) and sends a custom message to the username (iuser1). In return, the addressed username (user1), which is the IM master client, responds with a custom reply including the required information about the reflector service, such as its own IP address. The message can be sent as a custom IM, as a regular IM, or as a file using the file transfer mechanism. These communications may be conducted using conventional IM network communication procedures.

The IM peer client receives this custom reply from the IM network, disconnects from the IM network, and connects to the reflector service offered by the IM master client using the obtained information. The race conditions that may occur during this stage are described in more detail below. In some aspects the IM peer clients may use other conventional service discovery protocols to discover service information for the IM reflector service.

Reflector Service:

The reflector service runs on an IM master client. The reflector service has, at any one time, zero or more number of IM peer clients connected to it. This number may be restricted in some cases where only a few certain total fixed number of IM clients can share a common user name. The reflector service receives all the Instant Messages that an IM peer client wishes to send using a first username (user1), and uses the IM master client to send those messages to the IM network as user1. Similarly, it receives and presents each received IM message sent to each IM peer client using the first username (user1). Alerts and other actions are similarly handled by the reflector service acting as intermediary between the master IM client and the peer IM clients. It is possible to configure the reflector service to support only a subset of IM capabilities. For example, a reflector service may be configured to distribute the messages received by the IM master client to each IM peer client, but not give the IM peer clients the ability to send messages. Similarly, other capabilities such as file transfer, alerts, and the like, may be configured to be made available to an IM peer client, or not. The reflector service may be configured to support IM peer clients from only certain network hosts, as identified by their IP address. Alternately, the reflector service may disallow (ban) IM peer client connections to the IM reflector service from certain network hosts, as identified by their network address. The reflector service may use its own username and password, and/or the IM username and password, which the IM peer client supplies to successfully connect.

Dynamic Role Assignment:

If the master IM client exits (or crashes), the IM peer clients learn of this condition, as their connection with the reflector service running on the IM master client is disconnected. In this situation each of the IM peer clients may attempt to become the new IM master client. One of the peers eventually wins and becomes the new IM master client. It then starts the reflector service and the IM peer clients follow the same steps described above to locate the new master and connect to its reflector service.

On discovering that the previous IM master client has exited, a (new) IM master client election process starts. A timeline is initialized to zero at each current IM peer client, to start the election process. Each IM peer client attempts to login onto the IM network using the username (user1) and password (passwd1). The login is attempted by each IM peer client after waiting for a random delay value, between 0 and a fixed maximum preset time (T1) value.

Because of the nature of the IM networks, each IM peer client, as it logs onto the IM network using the same username, disconnects the current IM client using the same username from the IM network. The last IM peer client to login onto the IM network using the username user1 is, thus, left logged onto the network. Each IM peer client attempts to login to the IM network exactly once at this stage. After attempting, and being successful in an initial login to the IM network, each client waits for another preset time period (T2) from the start of the master IM client election process (when the timeline was initialized to zero).

If during this process this client using the username user1 is disconnected from the IM network, it continues its role of an IM peer client. It then uses the steps described above to locate the new IM master client and connect to its reflector service. This is done starting at time T2. Note, this exemplary election process is only one of many possible procedures, as the election process may be supported using a variety of collision-avoidance techniques that are well known for communication devices sharing a communication channel.

If the client is not disconnected from the IM network during this period, then it is the new IM master client and it starts the reflector service, following the above-described steps to establish its role as the IM master client.

It is possible that some IM clients may be pre-configured to always be IM peer clients. Thus, they do not take part in the IM master client elections. Alternately, only a single IM client may be installed on a certain device with the privilege of being a master IM client for a particular username. In this case, the IM peer clients never attempt to become IM master clients.

If an IM peer client exits at any time, the IM master client is informed, as the IM peer client is connected to its reflector service. The IM master client then removes this IM peer client from its list of connected clients and continues as before.

An IM master client may be disconnected from the IM network, for example, in response to a conventional IM client logging in using the username (user1). In this case, the IM master client closes its reflector service, and an IM master client election process is started. Alternately, the initial IM master client may be enabled to retain its role, and attempt to login onto the IM network. The login by the initial IM master client results in the other IM client (not supporting the reflector service) being disconnected.

Race Conditions

When a device is logging onto the IM network using the helper user name (userhelper1) to check whether the username (user1) is already online, another device may be attempting to do the same (using the username userhelper1). In this situation, one of the two devices may be disconnected from the network before it is able to obtain IM master client connection information. In this case, the disconnected device waits a random amount of delay time (between 0 and a preset time value T3) before attempting the same process again. The device will eventually succeed.

When a device logs into to the IM network using the helper username (userhelper1) and determines that the primary username (user1) is not online, it disconnects from the network and attempts to login onto the IM network using the primary username (user1) in an attempt to become the IM master client. It is possible that another device is simultaneously attempting the same procedure, using the primary username (user1) in an attempt to become the IM master client. This situation is similar to the case when the IM master client is elected after the initial IM master client exits.

When a device, which is currently an IM peer client and is participating in a new IM master client election after the initial IM master client exits, gets disconnected after attempting to login onto IM network using the primary username (user1), the device attempts to login using helper username (userhelper1). If, after successfully logging onto the IM network with the helper username, the device is unable to get a response from the new IM master client after N re-tries, it follows the steps given above for the election of a new IM master client.

To avoid race conditions, it is possible that the IM master client role is fixed using some out-of-band mechanism, or some configuration process that only permits predetermined device(s) to be take the role of the IM master client.

FIG. 2 is a flowchart illustrating the present invention method for establishing an IM reflector service. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 200.

Step 202 establishes an interface between an IM network and an IM master client identified with a first username. In one aspect, Step 202 establishes an interface between an IM server and the IM master client. Step 204 establishes a reflector service between the IM master client and an IM peer client. Step 206 identifies the IM peer client with the first username. In one aspect, Step 206 routes IM messages associated with the first username via the IM master client. Step 208 simultaneously presents IM messages addressed to the first username on both IM master and IM peer client user interfaces.

In one aspect, establishing a reflector service between the IM master client and an IM peer client in Step 204 includes establishing a reflector service between the IM master client and a plurality of IM peer clients. Then, Step 206 identifies each of the plurality of IM peer clients using the first username.

In another aspect, routing IM messages associated with the first username via the IM master client in Step 206 includes communicating IM messages between the IM network and all IM clients identified with the first username. Communicating IM messages with all IM clients identified with the first username may include substeps. In Step 206a the IM master client receives IM messages, from the IM network, addressed to the first username. In Step 206b the IM master client distributes the IM messages to IM peer clients identified with the first username, via the reflector service. In Step 206c the IM master client receives IM messages from the IM peer client, via the reflector service. In Step 206d the IM master client sends the IM messages to the IM network for distribution, identifying the first username as the source.

In a different aspect, establishing a reflector service between the IM master client and an IM peer client in Step 204 includes the IM peer client performing the following substeps. Step 204a logs onto the IM network using a first helper username. Step 204b discovers if the first username is logged on. Step 204c discovers connection information associated with the IM master client. Step 204d logs off the IM network. Step 204e connects to the reflector service offered by the IM master client using the discovered connection information.

Discovering connection information associated with the IM master client in Step 204c includes additional substeps (not shown) performed by the IM peer client. Step 204c1 sends a reflector discovery message, via the IM network, to the first username. Step 204c2 receives a connection information message from the IM master client including an IP address and port number. Then, connecting to a reflector service offered by the IM master client in Step 204e includes substeps (not shown) performed by the IM peer client. Step 204e1 opens a network connection with the IM master client. Step 204e2 uses the IM master client as an intermediary link with the IM network. For example, Step 204e1 may open a TCP/IP connection. In another aspect, connecting to the reflector service offered by the IM master client (Step 204e) includes connecting to the IM master client using a reflector service-specific username and password.

In another aspect, the method comprises further steps. Step 210, in response to discovering the first username is not online, elects an IM master client as follows, the IM peer client: logs off the IM network; logs onto the IM network using the first username; and, establishes an interface with the IM network as the IM master client. For example, Step 210 may include substeps (not shown). Step 210a initializes a clock period. Step 210b, in response to a random time delay, each IM peer client logs on using the first username. Step 210c elects the last IM peer client logging on, before the expiration of the clock period. Note, in some aspects Steps 210 and 202 are the same step.

In a different aspect, establishing an interface between an IM network and an IM master client identified with a first username in Step 202 includes additionally identifying the IM master client with a first password required for IM network communications. Likewise, identifying the IM peer client with the first username in Step 206 includes additionally identifying the IM peer client with the first password, through the reflector service.

FIG. 3 is a flowchart illustrating the present invention method for communicating via an IM reflector service. The method starts at Step 300. Step 302 establishes a reflector service, between an IM master client with an IM network first username, and an IM peer client. Step 304 identifies the IM peer client with the first username. In one aspect, identifying the IM peer client with the first username (Step 304) includes routing IM messages associated with the first username via the IM master client. Step 306 simultaneously presents IM messages addressed to the first username on both IM master and IM peer client user interfaces.

In another aspect, routing IM messages associated with the first username via the IM master client includes substeps. In Step 304a the IM master client receives IM messages, from an IM network, addressed to the first username. In Step 304b the IM master client distributes the IM messages to IM peer clients identified with the first username, via the reflector service.

In a different aspect, Step 304 includes the IM master client receiving IM messages from the IM peer client, via the reflector service, for distribution on the IM network, identified as originating from the first username.

FIG. 4 is a flowchart illustrating a variation in the present invention method for communicating via an IM reflector service. The method starts at Step 400. Step 402 establishes IM network first username reflector services with an IM peer client. Step 404 routes IM messages associated with the first username via the reflector services.

In one aspect, routing IM messages associated with the first username via the reflector services in Step 404 includes the IM peer client receiving IM messages from an IM network, addressed to the first username, via the reflector service. In another aspect, routing IM messages associated with the first username via the reflector services (Step 404) includes the IM peer client sending IM messages via the reflector service, for distribution on the IM network, identified as originating from the first username.

A system and method have been presented for an IM reflector service. Examples have been for uses to which the invention may be put. Examples have also been presented to clarify connection and communication procedures. However, the invention is not limited to merely these examples. Other variations and embodiments of the invention will occur to those skilled in the art.

I claim:

1. A method for establishing an Instant Messenger (IM) reflector service, the method comprising:
   establishing an interface between an IM network and an IM master client device identified with a first username;
   establishing a reflector service between the IM master client device and an IM peer client device, in response to the IM peer client device:
   logging onto the IM network using a first helper username;
   discovering if the first username is logged on;
   discovering connection information associated with the IM master client device;
   logging off the IM network;
   connecting to the reflector service offered by the IM master client device using the discovered connection information; and,
   identifying the IM peer client device with the first username and communicating IM messages between the IM network and all IM client devices identified with the first username.

2. The method of claim 1 wherein establishing an interface between an IM network and an IM master client device identified with a first username includes establishing an interface between an IM server device and the IM master client device.

3. The method of claim 1 wherein communicating IM messages with all IM client devices identified with the first username includes:
   the IM master client device receiving IM messages, from the IM network, addressed to the first username; and,
   the IM master client device distributing the IM messages to IM peer client devices identified with the first username, via the reflector service.

4. The method of claim 3 further comprising:
   simultaneously presenting IM messages addressed to the first username on both IM master and IM peer client user interfaces.

5. The method of claim 1 wherein communicating IM messages with all IM client devices identified with the first username includes:
   the IM master client device receiving IM messages from the IM peer client device, via the reflector service; and,
   the IM master client device sending the IM messages to the IM network for distribution, identifying the first username as the source.

6. The method of claim 1 further comprising:
   in response to discovering the first username is not online, electing an IM master client device as follows, the IM peer client device:
   logging off the IM network;
   logging onto the IM network using the first username; and,
   establishing an interface with the IM network as the IM master client device.

7. The method of claim 6 wherein electing a new IM master client device includes:
   initializing a clock period;
   in response to a random time delay, each IM peer client device logging on using the first username; and,
   electing the last IM peer client device logging on, before the expiration of the clock period.

8. The method of claim 1 wherein discovering connection information associated with the IM master client device includes the IM peer client device:
   sending a reflector discovery message, via the IM network, to the first username; and,
   receiving a connection information message from the IM master client device including an IP address and port number; and,
   wherein connecting to a reflector service offered by the IM master client device includes the IM peer client device:
   opening a network connection with the IM master client device; and,
   using the IM master client device as a intermediary link with the IM network.

9. The method of claim 8 wherein opening a network connection with the IM master client device includes opening a TCP/IP connection.

10. The method of claim 1 wherein establishing an interface between an IM network and an IM master client device identified with a first username includes additionally identifying the IM master client device with a first password required for IM network communications; and,
    wherein identifying the IM peer client device with the first username includes additionally identifying the IM peer client device with the first password, through the reflector service.

11. The method of claim 1 wherein connecting to the reflector service offered by the IM master client device includes connecting to the IM master client device using a reflector service-specific username and password.

12. The method of claim 1 wherein establishing a reflector service between the IM master client device and an IM peer client device includes establishing a reflector service between the IM master client device and a plurality of IM peer client devices; and,
    wherein identifying the IM peer client device with the first username includes identifying each of the plurality of IM peer client device using the first username.

13. A computer readable medium having computer implemented program code stored therein for operating an Instant Messenger (IM) reflector service system, the system comprising:

an IM master client computing device with an IM network first username, the IM master device having computer program code stored in a tangible memory medium for interfacing to an IM network and supplying an IM reflector service, an IM peer client computing device, identified with the first username, the IM peer client device having computer program code stored in a tangible memory medium for interfacing with the IM master client device to receive IM reflector services;

wherein the IM master client device receives electrical signals representing Im messages form the IM network addressed to the first username, and distributes electrical signals representing the IM messages to IM peer client devices identified with the first username, via the reflector service; and, wherein the IM peer client device establishes a reflector service connection by;
  logging onto an IM network using a first helper username;
  discovering if the first username is logged on;
  discovering connection information associated with the IM master client device;
  logging off the IM network; and,
connecting to the reflector service offered by the IM master client device using the discovered connection information.

14. The system of claim 13 further comprising:
an IM server computer device having a computer program code stored in a tangible memory medium for interfacing to the IM master client device via the IM network interface.

15. The system of claim 13 further comprising:
an IM master client user interface (UI) for presenting IM messages addressed to the first username; and,
an IM peer client UI for simultaneously presenting IM messages addressed to the first username.

16. The system of claim 13 wherein the IM master client device receives IM messages from the IM peer client device, via the reflector service, and sends the IM messages to the IM network for distribution, identifying the first username as the source.

17. The system of claim 13 wherein the IM peer client device, in response to discovering the first username is not online:
  logs off the IM network;
  logs onto the IM network using the first username; and,
  establishes an interface with the IM network as the IM master client device.

18. The system of claim 13 wherein the IM peer client device discovers connection information associated with the IM master client device by:

sending a reflector discovery message, via the IM network, to the first username; and,
receiving a connection information message from the IM master client device including an IP address and port number; and,
wherein the IM peer client device connects to the IM master client device reflector service by:
opening a reflector connection with the IM master client device; and,
using the IM master client device as an intermediary link with the IM network.

19. The system of claim 18 wherein the IM peer client device opens a TCP/IP connection with the master IM client device to receive reflector services.

20. The system of claim 13 wherein the IM master client device is additionally identified with a first password for communications with the IM network; and,
wherein the IM peer client device is additionally identified with the first password, through the reflector service.

21. The system of claim 13 wherein the IM peer client device connects to the IM master client for reflector services using a reflector service-specific username and password.

22. The system of claim 13 further comprising:
a plurality of IM peer client computing devices, each IM peer client device having computer program code stored in a tangible memory medium for interfacing with the IM master client device to receive IM reflector services, and each identified with the first username.

23. The system of claim 13 wherein the IM master client device disestablishes an interface with the IM network; and,
the system further comprising:
a plurality of IM peer client devices each IM peer client device having computer program code stored in a tangible memory medium for logging onto the IM network using the first username; and,
a new IM master client computing device having computer program code stored in a tangible memory medium for providing IM reflector services, elected from among the IM peer client devices logged on using the first username.

24. The system of claim 23 wherein the new IM master client device is elected from among the plurality of IM peer client devices logged on using the first username in response to:
each IM peer client device initializing a clock period;
in response to a random time delay, each IM peer client device logging on using the first username, and,
electing the last IM peer client device logging on, before the expiration of the clock period.

* * * * *